United States Patent
Francillon et al.

(10) Patent No.: US 7,941,725 B2
(45) Date of Patent: May 10, 2011

(54) METHOD FOR CIPHERING DATA WITH ERROR CORRECTION CODE

(75) Inventors: Aurélien Francillon, Grenoble (FR); Vincent Roca, Domene (FR); Christoph Neumann, Grenoble (FR); Pascal Moniot, Bernin (FR)

(73) Assignee: STMicroelectronics SA, Montrouge (FR)

(*) Notice: Subject to any disclaimer, the term of this patent is extended or adjusted under 35 U.S.C. 154(b) by 1176 days.

(21) Appl. No.: 11/641,613

(22) Filed: Dec. 19, 2006

(65) Prior Publication Data

US 2007/0174754 A1    Jul. 26, 2007

(30) Foreign Application Priority Data

Dec. 21, 2005  (FR) .................................... 05 13071

(51) Int. Cl.
*H03M 13/00* (2006.01)

(52) U.S. Cl. ................... 714/752; 375/240.27

(58) Field of Classification Search .............. 714/752; 726/21, 24; 380/29, 278; 713/163; 375/240.27
See application file for complete search history.

(56) References Cited

U.S. PATENT DOCUMENTS

| | | | | |
|---|---|---|---|---|
| 5,319,707 A | * | 6/1994 | Wasilewski et al. | 380/212 |
| 5,504,818 A | * | 4/1996 | Okano | 713/166 |
| 5,604,806 A | * | 2/1997 | Hassan et al. | 380/44 |
| 5,793,871 A | * | 8/1998 | Jackson | 380/54 |
| 6,404,806 B1 | * | 6/2002 | Ginesi et al. | 375/222 |
| 6,944,297 B2 | * | 9/2005 | Sako et al. | 380/201 |
| 7,062,785 B2 | * | 6/2006 | Sako et al. | 726/31 |
| 7,353,400 B1 | * | 4/2008 | Folmsbee | 713/190 |
| 7,373,500 B2 | * | 5/2008 | Ramelson et al. | 713/150 |
| 7,469,344 B2 | * | 12/2008 | Folmsbee | 713/190 |
| 7,487,552 B2 | * | 2/2009 | Sako et al. | 726/31 |
| 7,653,198 B2 | * | 1/2010 | Sako et al. | 380/239 |
| 2003/0012372 A1 | * | 1/2003 | Cheng | 380/28 |

FOREIGN PATENT DOCUMENTS

| EP | 0 924 890 A2 | 6/1999 |
|---|---|---|
| EP | 1 193 904 A2 | 4/2002 |

OTHER PUBLICATIONS

John Byers et al., "Securing Bulk Content Almost for Free," Computer Communications, vol. 29, No. 3, Feb. 1, 2006, pp. 280-290.

\* cited by examiner

*Primary Examiner* — Esaw T Abraham

(57) ABSTRACT

A method and a system for coding digital data represented by source symbols (Si) with an error-correction code. The error-correction code generates parity symbols (Pj) based on, for each parity symbol, several source symbols and at least one parity symbol of preceding rank. At least a part of the source symbols is submitted to at least a first ciphering. The obtained ciphered symbols and the rest of the unciphered source symbols are submitted to the error-correction code.

30 Claims, 4 Drawing Sheets ns of bytes
METHOD FOR CIPHERING DATA WITH ERROR CORRECTION CODE

CROSS-REFERENCE TO RELATED APPLICATION AND CLAIM OF PRIORITY

This patent application claims priority under 35 U.S.C. §119(a) to French Patent Application No. 0513071 entitled "SECURE ERROR-CORRECTION CODE" filed on Dec. 21, 2005, which is hereby incorporated by reference.

TECHNICAL FIELD

The present disclosure generally relates to digital data transmissions using error-correction codes and more specifically relates to transmissions in which the data are desired to be readable only by an authorized receiver. In particular, the present disclosure applies to one-way transmission systems such as, for example, broadcasting systems, or other systems in which the receiver is not capable of communicating with the transmitter.

BACKGROUND

FIG. 1 is a schematic block diagram of an exemplary data transmission system of the type to which the present disclosure may be applicable. The data transmission system is a broadcasting system such as, for example, Digital Video Broadcasting (DVB) in which a transmitter 1 encodes data to be transmitted to a great number of receivers 2. The specific number of receivers 2 is generally not known. The transmission may be a radio transmission, with or without intervention of a relay satellite 3. Each receiver 2 includes an antenna 22 communicating, for example, over wire connection 21, with a television set 24. On the side of transmitter 1, the broadcaster communicates by a transmission antenna 11 with satellite 3 to broadcast programs and more generally any type of data. More generally, the communication support may be of any type (Internet network, for example).

FIG. 1 is an example of a conventional one-way system where the receivers are not able to transmit information towards the satellite back to the transmitter. When the rights of access to certain programs are desired to be limited, it is necessary to add to television set 24, or to integrate thereto, a specific decoder 23 comprising keys enabling decoding of programs transmitted in ciphered manner.

Other conventional systems to which the present disclosure may apply are mobile telephony type systems in which, although a bi-directional communication channel exists between the operator and the mobile phone, the telephones are likely to receive broadcast data at a large scale, the operator being used as a relay only. Thus, it is difficult to consider having each receiver mobile phone communicate with the transmitter, the mobile phone behaving as a broadcast program receiver.

Most often, in conventional digital data transmission systems, the data flow is combined by an error-correction code (FEC, for forward error-correction), for enabling data recovery in case of interference in the transmission. The need for error-correction codes is also linked to the absence of a bi-directional communication preventing the receiver from indicating to the transmitter that it has not properly received part of the data.

Conventional systems typically use codes operating on a symmetrical binary channel (i.e., a bit can be received with no error or need for inversion). The error-correction code then checks the coherence of the bits received over the channel. Such error-correction codes are generally integrated to the physical layer.

There also exist conventional error-correction codes which operate on a symbol deletion channel, the symbols representing one or several bits or bytes. In symbol deletion channels, a symbol can either be received with no error, or destroyed by the channel. The symbol is the unit (byte or bit sequence) of processing by the system and its size is fixed. Such error-correction codes are generally used above the physical layer.

The present disclosure applies to the processing of error-correction codes at the level of the symbols, which most often have a size of several hundreds or several thousands of bytes or bits. Such error-correction coding generates an increase in the volume of data to be transmitted. A code rate is generally defined as being the number (k) of source symbols of the object to be transmitted (file, data flow, etc.) divided by a total number (n) of symbols. The n symbols are formed of the k source symbols and of the n−k parity symbols. Ratio k/n is smaller than or equal to one, and generally range between ⅔ and 1.

FIGS. 2A, 2B and 2C very schematically illustrate an exemplary error-correction coding of the type to which the present disclosure more specifically applies. It is a so-called LDPC (low density parity check) technique which exploits a parity matrix formed of a portion (or sub-matrix) of source symbols and of a portion (or sub-matrix) of parity symbols. The interpretation of such a matrix provides the transmitted parity symbols in addition to the source symbols.

FIG. 2A arbitrarily illustrates the flow 30 of source symbols $S_1, S_2 \ldots, S_i, S_{i+1} \ldots, S_k$. FIG. 2B illustrates an example of a parity matrix 31 in which each of the first k columns (sub-matrix of source symbols) is assigned to one of symbols $S_i$ (i ranging between 1 and k) and each of the last n−k columns (sub-matrix of parity symbols) is assigned to one of parity symbols $P_j$ (j ranging between 1 and n−k). The parity matrix comprises n−k lines $L_1$, $L_2$, etc. respectively assigned to the parity symbols to be calculated (and to be transmitted). Each element of the first matrix portion represents the taking into account (1) or not (0 or nothing) of the symbol of the corresponding column in the calculation of the symbol of the current line. The construction of the parity matrix is in this example said to be an LDPC staircase construction. It may be comprised of several thousands of columns and several thousands of lines.

To read matrix 31, it must be considered that the XOR-type combination ($\oplus$) of the source or parity symbols identified in each line must be zero. For example, for the third line, $S_2 \oplus \ldots S_i \oplus \ldots \oplus P_2 \oplus P_3 = 0$. On the receive side, knowing the parity matrix, it is possible to perform the operations of recovery of the transmitted source symbols.

The forming of the sub-matrix of source symbols depends on the application. For example, a pseudo-random generation may be used. A first solution to cipher a data flow would be to submit all the symbols upstream or downstream of the coding to a ciphering algorithm (AES, DES, RC4, etc.). A disadvantage of such a solution is the processing time, be it on the transmit or receive side. Indeed, error-correction codes and ciphering algorithms have to process data integrally and are expensive in terms of access and/or memory consumption, as well as in terms of time of processing by a central processing unit, and thus of power.

Error-correction codes and ciphering algorithms, however, pursue other opposite goals. For example, an error-correction code aims at easing the data recovery, while a ciphering algorithm conversely aims at making the data recovery difficult for a receiver that does not have the right key. In addition, a data-ciphering function in error-correction codes generates a processing time which adds to the coding time. This problem is particularly acute on the receiver side, where processing capacities must be optimized.

FIG. 3 is a schematic block diagram illustrating a known method for ciphering data to be broadcast with an error-correction function. This method is described in article "Securing Bulk Content Almost for Free" by J. Byers et al., accepted in Computer Communication Journal in January 2005 (http://www.sciencedirect.com), to be published in "Computer Communication Journal, Special Issue on Network Security".

On the side of transmitter 1, data DATA (block 12) to be transmitted are submitted to an FEC-type coding (block 13, CODE). The coding output provides a number of symbols greater than the number of input symbols. Then, 4% of the coded symbols (0.04(n−k)) are submitted to a ciphering (block 14, CIPHER) before transmission while the remaining 96% (0.96(n−k)) are transmitted directly. The coding may be of so-called Tornado type but it may also be, for example, of the LDPC type or of another suitable type. The transmitter of course includes transmission elements (not shown) for, for example, a radio broadcasting.

On the side of receiver 2, the flow of n−k symbols received from antenna 22 is, after demodulation and other receive processings (level matching, filtering, etc.), partly submitted (4%) to a deciphering (block 26, DECIPHER) before being entirely submitted to the decoding (block 25, DECODE), where 96% of the symbols need not be deciphered. The output of block 25 provides the flow of k decoded data symbols to be transmitted, for example to a television set 24. As a variation of the ciphering, a secure channel may also be used to transmit the 4% of the symbols intended to condition the proper obtaining of the data on the receiver side.

A disadvantage of the solution shown in FIG. 3 is that it is not secure enough (not resistant enough to crypto-analysis). Indeed, attacks on the 96% of the symbols not submitted to the ciphering may enable restoring the plain symbols. For example, by means of statistical analyses on the parity symbols which most often correspond to an XOR-type combination of source symbols, it is possible to recover the transmitted data. In particular, if the source data are formed of a significant number of null data (byte=00), the data are transmitted almost plainly. Further, in the case of a text file, a lexical analysis quite easily enables recovering portions of the original content. Moreover, if a same file is transmitted twice with a low number of difference bits, the obtained output flow is almost identical, which also is a weakness. For the ciphering to be efficient, the input flow would have to be perfectly random, which is in practice never the case.

Therefore what is needed is a system and method for improving the combination of error-correction code processing and a ciphering algorithm for use in digital data transmission.

SUMMARY

To address the above-discussed deficiencies of the prior art, the present disclosure seeks to overcome the disadvantages of conventional solutions combining an error-correction code processing with a ciphering for a digital data transmission. The present disclosure more specifically aims at providing a solution improving the resistance to crypto-analysis of the transmitted data, without for all this returning to a solution requiring the ciphering of all the data.

In one embodiment, a method for coding digital data (DATA) is provided. The digital data is represented by source symbols ($S_i$) with an error-correction code for generating parity symbols ($P_j$) based on, for each parity symbol, several source symbols and at least one parity symbol of preceding rank. The method includes submitting part (mk) of the source symbols to at least a first ciphering. The method also includes submitting the obtained ciphered symbols and the rest of the unciphered source symbols to the error-correction code.

In another embodiment, a digital data transmitter in an error-correction code transmission system is disclosed. The transmitter includes a circuit configured to code digital data (DATA) represented by source symbols ($S_i$) with an error-correction code for generating parity symbols ($P_j$) based on, for each parity symbol, several source symbols and at least one parity symbol of preceding rank.

In still another embodiment, a system for transmitting digital data by application of an error-correction code is provided. The digital encoding circuit codes digital data (DATA) represented by source symbols ($S_i$) with an error-correction code for generating parity symbols ($P_j$) based on, for each parity symbol, several source symbols and at least one parity symbol of preceding rank. The encoding circuit submits part (mk) of the source symbols to at least a first ciphering and submits the obtained ciphered symbols and the rest of the unciphered source symbols to the error-correction code.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
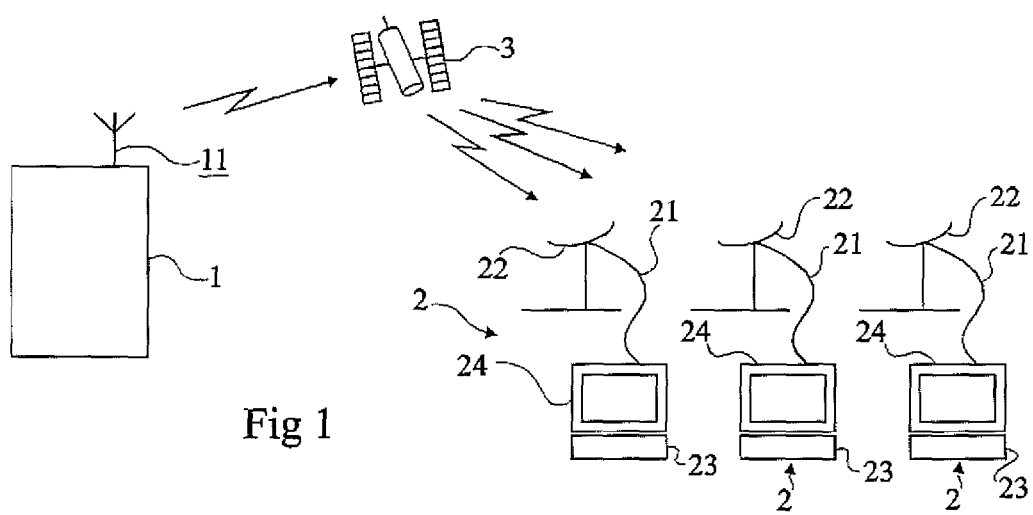
FIG. 1 is a schematic block diagram of an exemplary broadcasting system of the type to which the present disclosure applies.
Figure 2A:
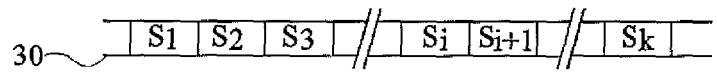
FIGS. 2A, 2B and 2C illustrate a conventional LDPC-type error-correction code coding mechanism.
Figure 2B:
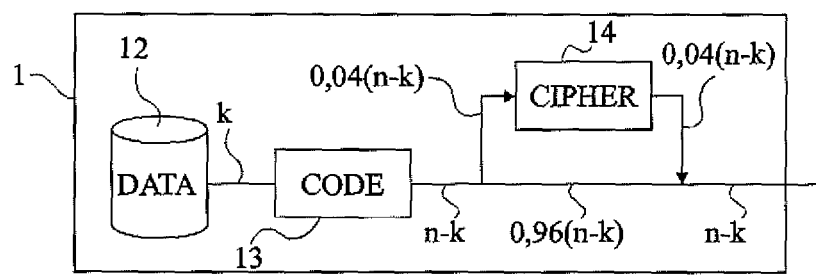
Figure 2C:
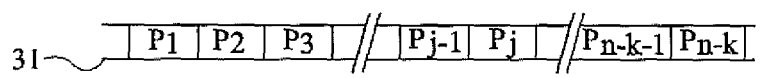
Figure 3:
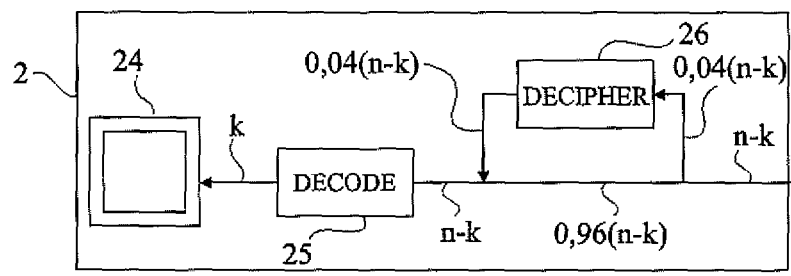
FIG. 3 is a schematic block diagram illustrating a conventional technique combining a ciphering and an error-correction code.

For FIGS. 2 through 9, the same elements have been designated with the same reference numerals in the different drawings. Further, for clarity reasons, only those steps and elements which are useful to the understanding of the present disclosure have been shown in the drawings and will be described hereafter. In particular, the actual means of transmission, especially of modulation and demodulation, have not been detailed, the present disclosure being compatible with any conventional system. Further, the ciphering algorithms usable by the present disclosure have not been detailed either, the present disclosure being here again compatible with any conventional symmetrical algorithm.

Figures 4, 5, 6:
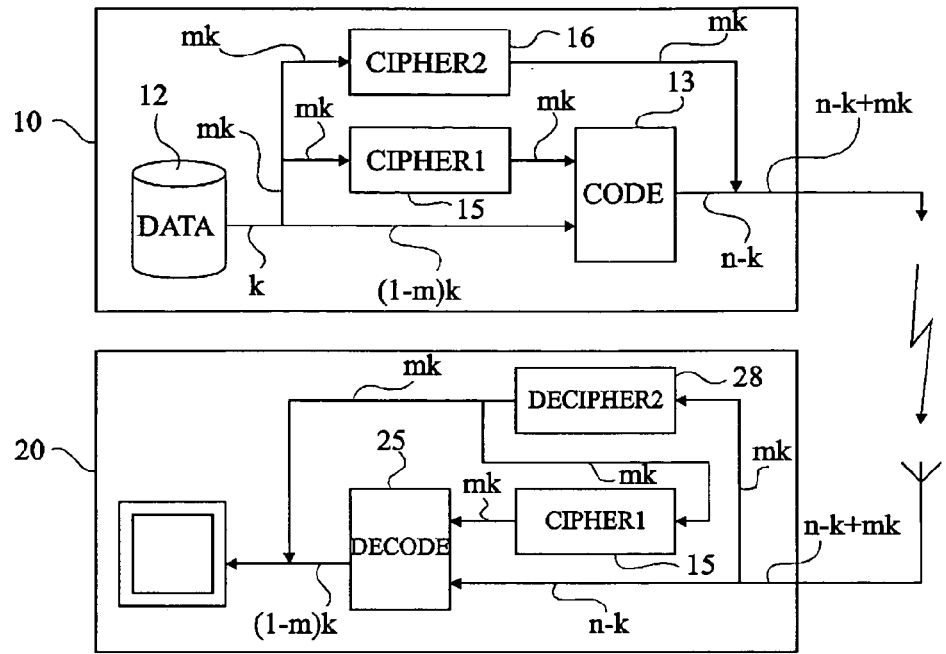
FIG. 4 is a schematic block diagram of an example of a ciphering and coding system according to one embodiment of the present disclosure.
FIG. 5 illustrates one embodiment of the present disclosure with an example parity matrix.
FIG. 6 illustrates one embodiment of the present disclosure with an example parity matrix.

The present disclosure generally provides a system and method for selecting part of the source symbols to be submitted to a ciphering, then applying the coding to all symbols, be they or not ciphered. FIG. 4 is a schematic block diagram illustrating one embodiment of a system of ciphered transmission coded according to the present disclosure. On the side of transmitter 10, data DATA (12) to be transmitted are partly submitted (mk source symbols with m<1) to a first ciphering algorithm (block 15, CIPHER1), to be submitted as ciphered with the rest (1−m)k of the source symbols (not ciphered) to the error-correction code (block 13, CODE). These mk source symbols are also transmitted, either ciphered by the first algorithm or, as shown, ciphered by a second algorithm (block 16, CIPHER2), without passing through the error-correction code. The second ciphering algorithm differs from the first one by the type of algorithm and/or by the used key. A significant difference with respect to the preceding solutions is that the mk source symbols are also taken into account by error-correction code 13. Code 13 provides n−k parity symbols to which add, for the transmission, the mk source symbols transmitted ciphered (without passing through the error-correction code).

On the side of receiver 20, in the flow of n−k(1−m) received symbols, the mk ciphered source symbols are deciphered by being submitted to the second algorithm (block 28, DECIPHER2). The mk plain source symbols are then ciphered by the first algorithm (block 15, CIPHER1) to be provided to the decoder (block 25, DECODE). The decoder provides the (1−m) k source symbols, the mk missing symbols being directly provided by the second algorithm. The k symbols are then exploited, for example, by a television set.

If the two ciphering algorithms are identical and use the same key, it is not necessary, on the receive side, to cipher back the mk symbols. The symbols are deciphered to be used directly and are submitted in parallel, such as received, to code 25 with the rest of the symbols. Such a variation is however less effective regarding the security of the transmitted data (resistance to crypto-analysis). Proportion m of symbols submitted to the ciphering must remain low (for example, ranging between 0.1% and 10% and, preferably, between 0.1% and 1%) to avoid coming once again across the disadvantages of techniques comprising the steps of ciphering and coding of all symbols.

FIG. 5 illustrates, in a representation of a parity matrix 31', an embodiment of the present disclosure. A feature of this embodiment is to cipher (ciphering symbolized by a function E in FIG. 5), a reduced number of the first lines of source symbols present in parity matrix 31'. In this example, the data symbols $S_1$, $S_6$, $S_9$, $S_3$, and $S_5$ present in the first two lines ($L_1$ and $L_2$) of matrix 31' are ciphered before coding, while the other symbols which only appear in the subsequent lines are coded as they are. The application of the coding by using an LDPC staircase type parity matrix 31' results in that all parity symbols will contain ciphered data, which reduces the risk of crypto-analysis thereof. The parity symbol calculation is performed, as previously, by an XOR combination of the source (ciphered or not) and parity symbols of the line.

On the receive side, by receiving the n−k symbols $P_j$ (j taking the values from 1 to n−k), only one receiver possessing the ciphering key(s) will be able, by deciphering the mk source symbols transmitted as ciphered but not coded, and by then ciphering them again with the first algorithm, to restore a correct data symbol flow. Such a technique can be envisaged due to the fact that the parity matrix takes into account, in subsequent symbols, the content of the preceding symbols.

FIG. 6 is a parity matrix 31" according to one embodiment of the present disclosure. The source symbols to be ciphered (in this example, $S_1$, $S_5$, $S_8$, $S_{12}$) are selected so that each line of parity matrix 31" contains, in its source symbol portion, at least one ciphered symbol. Thus, data confidentiality is improved with respect to conventional solutions.

FIG. 6 also illustrates another modification with respect to the preceding embodiment, which is to use an LDPC parity matrix of triangle type, that is, in which each parity symbol from the third one $P_3$ is likely to combine more than two preceding parity symbols. Such a technique improves the security and the error-correction, that is, requires reception of a lesser number of symbols by a receiver so that it can successfully decode the original content. Since the symbol matrixes can comprise several thousands of columns and several thousands of lines, the fact of only ciphering a small number of symbols is advantageous from the regarding processing time.

Figures 7A, 7B, 8:
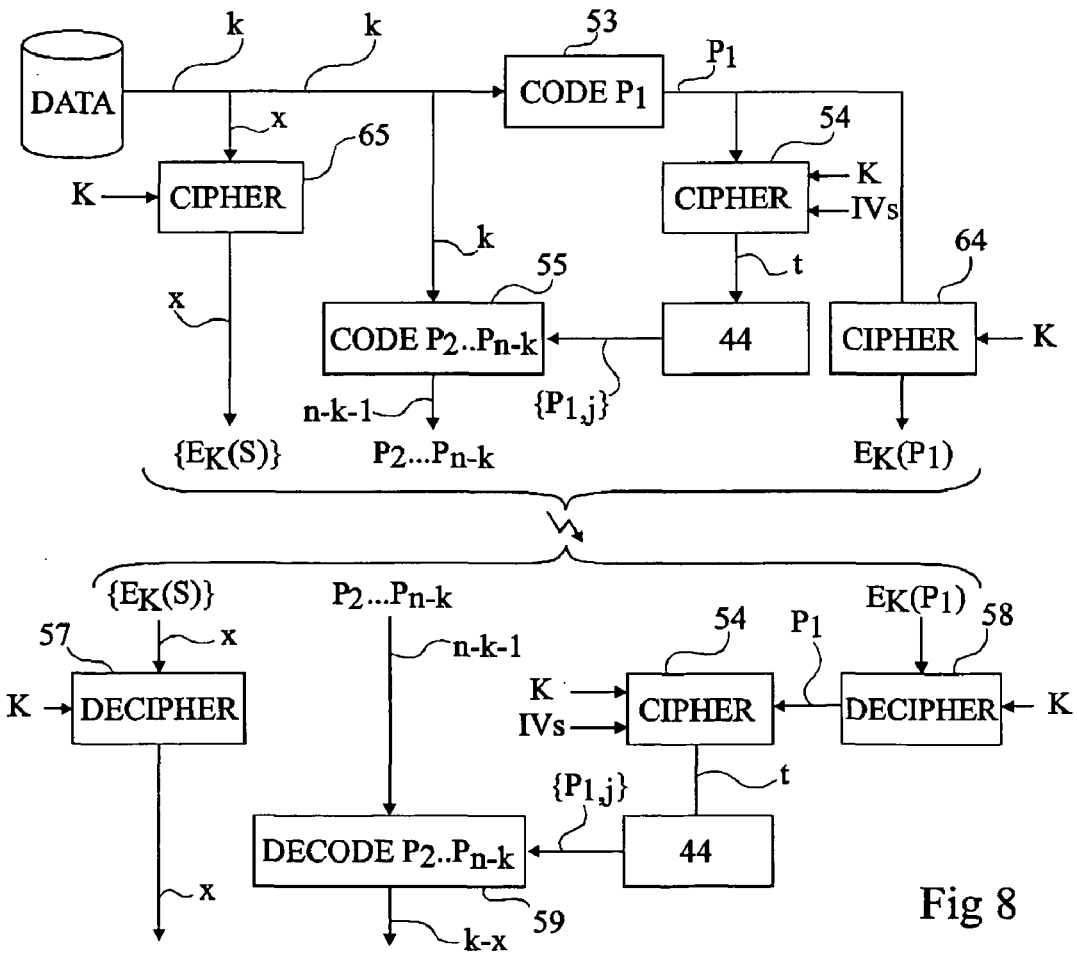
FIGS. 7A and 7B illustrate one embodiment of the present disclosure in matrix representations.
FIG. 8 is a schematic block diagram of one embodiment of a digital data transmission system according to the present disclosure.

FIGS. 7A and 7B illustrate, in matrix representations, one embodiment of the present disclosure. A feature of this embodiment is to use, apart from the parity matrix having a parity symbol portion, for example, of LDPC staircase type, a second matrix of values ciphered to generate several combinations respectively taken into account in the parity symbol calculation.

The ciphered values are, preferably, obtained by ciphering of one or several first parity symbols (number to be selected according to the system requirements to guarantee the information confidentiality). The combinations of ciphered values are then taken into account in the calculation of the parity symbols of higher ranks. For example, the used sub-matrix of parity symbols is a matrix of staircase type in which a first column contains the results of different combinations of several ciphered variations of the first parity symbol which, in this case, is securely transmitted to the receiver. The combinations are, preferably, different for each matrix line. Accordingly, the contribution of the first parity symbol is different in each parity symbol of the next lines.

In the example of FIG. 7A, sub-matrix 41 of source symbols is established conventionally (FIG. 2B), with no ciphered symbol. Parity sub-matrix 42 is established by following a so-called staircase LDPC technique for all the parity symbols from the second one ($P_2$ to $P_{n-k}$). Further, all the lines from the second one, and thus all the calculated parity symbols from the second one, take into account a value $P_{1,j}$ which is a function of the first ciphered parity symbol $P_1$. This is illustrated by a sub-matrix $42_1$ comprising, for each line from the second one, a value $P_{1,2}$, $P_{1,3}$. . . , $P_{1,n-k}$. In this example, it is assumed that symbol $P_1$ is not ciphered ($P_{1,1}=P_1$).

FIG. 7B shows a ciphering matrix 44 arbitrarily illustrating in a matrix representation an example of generation of values $P_{1,2}$, $P_{1,3}$. . . , $P_{1,n-k}$. Each value is obtained by combination of several variations $E_K(IV_1, P_1)$, $E_K(IV_2, P_1)$. . . , $E_K(IV_t, P_1)$ of the ciphering of parity symbol $P_1$ with a key K. Such variations are, for example, obtained by modifying an initialization vector IV of ciphering algorithm E. The ciphering algorithm is a symmetrical algorithm (for example, of DES or AES type used in CBC—Cipher Block Chaining—mode). Due to the combination of several variations ciphered to generate values $P_{1,j}$, number t of initialization vectors needs not be high (preferably ranging between 0.1% and 10% of the number of parity symbols). In this example, symbol $P_1$, preferably ciphered, must be received by the receiver so that it can restore the other symbols. Further, receiving it first improves decoding performances.

The combination of the different ciphered values in the creation of values $P_{1,j}$ is performed, for example, by means of an XOR operation. Other operations may also be used, for example, operations of rotation of the bits contained in the symbols. The combination operation is preferably selected according to the executed ciphering algorithm to avoid altering its performances in terms of resistance to crypto-analysis. Different types of operations may also be combined. In this case, ciphering matrix 44 contains the information (for example, through a word of two bits or more according to the number of operators) about the way in which ciphered variations $E_K(IV_1, P_1), E_K(IV_2, P_1) \ldots, E_K(IV_t, P_1)$ are combined in the obtaining of the combination $P_{i,j}$ assigned to each parity symbol $P_j$. For example, a 0 (00) in matrix 44 indicates that the variation is not taken into account, a 1 (01) indicates that the variation is taken into account by an XOR combination, a 2 (10) or a 3 (11) indicates a rotation by a fixed number (for example, 4 or 7) of bits of the current variation before XOR combination with the result of the combination of the preceding variations. In the simplified embodiment shown in FIG. 7B, a selection between two possibilities (0: variation of the column not taken into account; 1: taking into account of this variation by an XOR combination) is simply assumed.

Preferably, ciphering matrix 44 is periodically modified. For this purpose, it is sufficient to send the ciphering matrix generation seed and for the receiver to contain the software and/or hardware tools to reconstruct this matrix from the seed. This amounts to using, to transmit the ciphering matrix, the same technique as that used to transmit the parity matrix.

The embodiment shown in FIGS. 7A and 7B has, over the embodiment of FIG. 6, the advantage of being better for error-correction and, over the embodiment shown in FIG. 5, the advantage of being better in terms of resistance to crypto-analysis.

According to an alternative embodiment, symbol $P_1$ is constructed from all the source symbols (since sub-matrix 41 only comprises is in its first line). This improves the so-called "avalanche" effect in the other parity symbols and, accordingly, the ciphering, without adversely affecting the error-correction capacity.

According to another embodiment, first symbol $P_{1,1}$ itself originates from ciphering matrix 44 which combines ciphered values independent from the source symbols. In the representation shown in FIGS. 7A and 7B, this amounts to adding a line $P_{1,1}$ to matrix 44 and to taking into account, as a value to be ciphered, a quantity other than a combination $P_1$ of all or part of the source symbols. Matrix 42 also comprises one additional column to calculate first parity symbol $P_1$ according to the source symbols of the first line and to value $P_{1,1}$. There then is no further dependence between values $P_{1,j}$ and the source data.

FIG. 8 is a schematic block diagram illustrating one embodiment of a ciphering and coding system according to the present disclosure. The source symbols of the data (12) taken into account in the calculation of the first parity symbol are used to obtain said symbol (block 53, CODE P1). Symbol P1 is then ciphered (block 54, CIPHER) according to different initialization vectors $IV_S$ and to key K. The t obtained ciphered values are combined according to ciphering matrix 44 to obtain the respective values $P_{1,j}$ of the first parity symbol to be taken into account for the coding of the others (block 55, CODE $P_2 \ldots P_{n-k}$). All of the n-k parity symbols are then transmitted (broadcast). Preferably, a small number x (preferably between 0.1 and 1%) of the k source symbols which are ciphered with key K (block 65, CIPHER) is also selected. The x source symbols $E_K(S)$ ciphered with key K are transmitted in addition to the first parity symbol, preferably also ciphered $E_K(P_1)$ with this key K (block 64, CIPHER), and to the n-k-1 remaining parity symbols.

On the receive side, the first parity symbol is deciphered with key K (block 58, DECIPHER) as well as, if need be, the x source symbols $E_K(S)$ (block 57, DECIPHER). The first obtained parity symbol $P_1$ enables restoring values $E_K(IV_1, P_1), E_K(IV_2, P_1) \ldots, E_K(IV_t, P_1)$ ciphered with key K and thus restoring combinations $P_{i,j}$ (block 44) enabling decoding the n-k-1 remaining parity symbols $P_2, P_3, \ldots, P_{n-k}$ (block 59, DECODE $P_2, \ldots P_{n-k}$). The k-x remaining source symbols are then obtained.

The parity matrixes (sub-matrixes 41 and 42) and ciphering matrixes 44 must be transmitted (preferably at the beginning of a session and/or in secure fashion), as well as the ciphering initialization vectors (or a seed enabling restoring thereof) to enable all compatible receivers to restore the different matrixes. This restoring is however not sufficient to recover the source symbols. Only those symbols possessing key K will be able to decipher the first parity symbol to correctly decode the other symbols.

Figure 9:
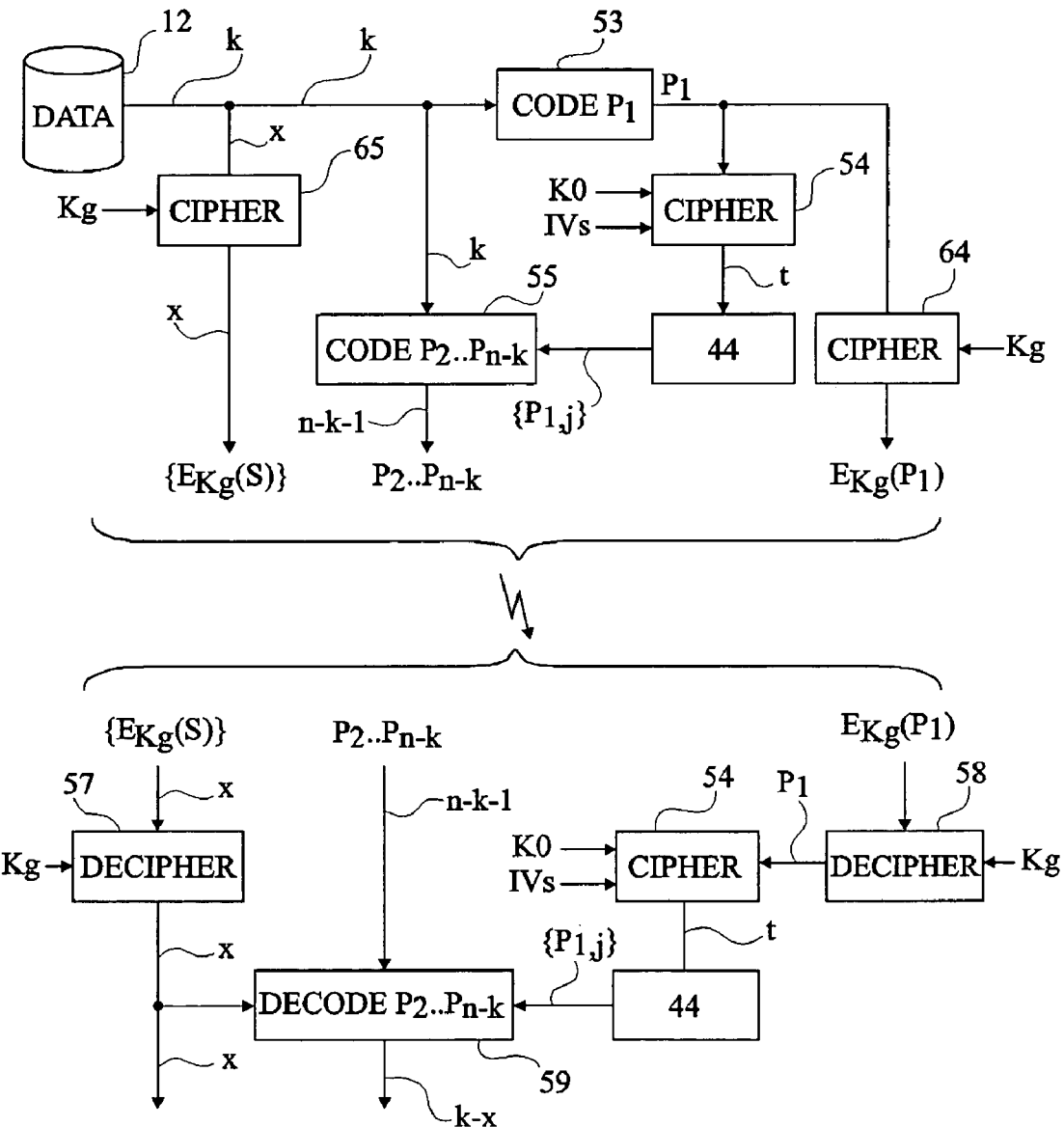
FIG. 9 is a schematic block diagram of one embodiment of a digital data transmission system according to the present disclosure.

FIG. 9 is a schematic block diagram illustrating one embodiment of the present disclosure. One key $K_g$ is assigned per user or per sub-group of users in addition to a key $K_0$ used for the ciphering of the parity symbols. As compared with the previous embodiment, the first transmitted parity symbol $P_1$ corresponds to a value $EK_g(P_1)$ ciphered with a key Kg (block 64, CIPHER) different from key $K_0$ used to obtain values $P_{1,j}$. The x ones of the k source symbols are ciphered with key Kg (block 65, CIPHER). The x source symbols $E_{Kg}(S)$ ciphered with key Kg are transmitted in addition to the first parity symbol ciphered with key Kg and to the n-k-1 parity symbols depending of the values ciphered with key $K_0$. In one case (not shown), the x source symbols are used in the ciphered version for the coding. Of course, the ciphering and parity matrixes (or seeds enabling generation thereof) are also transmitted, ciphered or not with key $K_0$. The same holds true for the initialization values generating the different values of the ciphering of the first parity symbol. According to a simplified variation, a single key Kg is used. This amounts to only providing a single group.

On the receive side, the x source symbols $E_{Kg}(S)$ are deciphered (block 57, DECIPHER) with key Kg, the same occurring for the first parity symbol (block 58, DECIPHER). The first obtained parity symbol $P_1$ enables restoring values $E_{K0}(IV_1, P_1), E_{K0}(IV_2, P_1) \ldots, E_{K0}(IV_t, P_1)$ ciphered with key $K_0$ and thus restoring combinations $P_{i,j}$ (block 44) enabling decoding, possibly using the x deciphered source symbols, the n-k-1 remaining parity symbols $P_2, P_3, \ldots, P_{n-k}$ (block 59, DECODE $P_2, \ldots P_{n-k}$). The k-x remaining source symbols are then obtained.

A receiver only possessing key $K_0$ is incapable of restoring the data. Similarly, a receiver only possessing key Kg is only capable of obtaining a very small part (less than 1%) of the source symbols. This embodiment enables broadcasting data to sub-groups of users of a common group possessing key $K_0$. An advantage is that the major part (more than 99%) of the transmitted content is the same for all receivers, a small part only of these symbols differing according to receivers, which simplifies calculations.

A restriction per groups of users such as discussed in relation with FIG. 9 may also be implemented according to one embodiment of the present disclosure. For example, a common key is used by the second ciphering algorithm (15, FIG. 4) while group keys are used for the first algorithm (block 14 and 26). Accordingly, the present disclosure improves the security of the transmitted data. The present disclosure is also compatible with the management of different groups of users.

Certain embodiments according to the present disclosure provide solutions particularly well adapted to large-scale broadcasting systems. In addition, the present disclosure provides a solution compatible with any ciphering algorithm and particularly well adapted for use with LDPC-type error-correction codes.

Of course, the present disclosure is likely to have various alterations, modifications, and improvements which will readily occur to those skilled in the art. In particular, the practical implementation of the present disclosure based on conventional hardware and/or software tools (for example, by electronic circuits and/or microprocessors) are within the abilities of those skilled in the art based on the functional indications given here above. In particular, the forming of the symbol flow resulting from the coding and ciphering of the present disclosure with, if need be, receiver parameterizing symbols (for example, indicating the applied ciphering type) is not a problem. Further, the present disclosure applies to different types of ciphering algorithms, the selection of which is to be made by those skilled in the art according to the application. Moreover, in the embodiments where source symbols are transmitted with no coding, the number of these symbols (between 0.1 and 1% of the source symbols) is to be selected by making a compromise between the calculation required on the receiver side and security (resistance to crypto-analysis).

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. method for coding digital data (DATA) for transmission over a data transmission system represented by source symbols (Si) with an error-correction code for generating parity symbols (Pj) based on, for each parity symbol, a plurality of source symbols and at least one parity symbol having a rank that precedes a rank of a parity symbol being generated, the method comprising:
    submitting part (mk) of the source symbols to at least a first ciphering; and
    submitting the obtained ciphered symbols and the rest of the unciphered source symbols to the error-correction code.

2. The method of claim 1, wherein the part (mk) of the source symbols ($S_i$) is submitted to a second ciphering for transmission with no coding, in addition to the parity symbols.

3. A method of claim 2 further comprising:
    deciphering the symbols submitted to the second ciphering and received with no coding;
    submitting the deciphered symbols to the first ciphering; and
    submitting the symbols resulting from the previous step and the received parity symbols ($P_j$) to a decoding by the error-correction code.

4. The method of claim 2, wherein the first and second cipherings differ by the used key and/or by the ciphering algorithm.

5. The method of claim 1, wherein the number (mk) of ciphered source symbols ranges between 0.1% and 1% of the total number (k) of source symbols ($S_i$).

6. The method of claim 1, wherein the source symbols ($S_i$) to be ciphered are selected so that each parity symbol ($P_j$) comprises at least one ciphered source symbol.

7. The method of claim 1, wherein the error-correction code is represented by a parity matrix in which each line represents an equation for obtaining a parity symbol ($P_j$) and each column represents a source symbol ($S_i$) or a parity symbol, each parity symbol being obtained by a combination of the source and parity symbols identified in the columns of the corresponding line.

8. The method of claim 7, wherein the source symbols ($S_i$) identified in less than 1% of the lines of the matrix based on the first one are submitted to the ciphering.

9. The method of claim 7, wherein the part of the parity symbols ($P_j$) of the matrix forms a staircase.

10. The method of claim 7, wherein the part of the parity symbols ($P_j$) of the matrix forms a triangle.

11. A digital data transmitter in an error-correction code transmission system, the transmitter comprising:
    a circuit configured to code digital data (DATA) represented by source symbols ($S_i$) with an error-correction code for generating parity symbols (Pp based on, for each parity symbol, a plurality of source symbols and at least one parity symbol having a rank that precedes a rank of a parity symbol being generated,
    wherein the circuit submits part (mk) of the source symbols to at least a first ciphering and submits the obtained ciphered symbols and the rest of the unciphered source symbols to the error-correction code.

12. The transmitter of claim 11, wherein the part (mk) of the source symbols ($S_i$) is submitted to a second ciphering for transmission with no coding, in addition to the parity symbols.

13. The transmitter of claim 12, wherein the circuit is further configured to:
    decipher the symbols submitted to the second ciphering and received with no coding;
    submit the deciphered symbols to the first ciphering; and
    submit the symbols resulting from the previous step and the received parity symbols ($P_j$) to a decoding by the error-correction code.

14. The transmitter of claim 12, wherein the first and second cipherings differ by the used key and/or by the ciphering algorithm.

15. The transmitter of 11, wherein the number (mk) of ciphered source symbols ranges between 0.1% and 1% of the total number (k) of source symbols ($S_i$).

16. The transmitter of claim 11, wherein the source symbols ($S_i$) to be ciphered are selected so that each parity symbol ($P_j$) comprises at least one ciphered source symbol.

17. The transmitter of claim 11, wherein the error-correction code is represented by a parity matrix in which each line represents an equation for obtaining a parity symbol ($P_j$) and each column represents a source symbol ($S_i$) or a parity symbol, each parity symbol being obtained by a combination of the source and parity symbols identified in the columns of the corresponding line.

18. The transmitter of claim 17, wherein the source symbols ($S_i$) identified in less than 1% of the lines of the matrix based on the first one are submitted to the ciphering.

19. The transmitter of claim 17, wherein the part of the parity symbols ($P_j$) of the matrix forms a staircase.

20. The transmitter of claim 17, wherein the part of the parity symbols ($P_j$) of the matrix forms a triangle.

21. A system for transmitting digital data by application of an error-correction code, the system comprising:
an encoding circuit to code digital data (DATA) represented by source symbols ($S_i$) with an error-correction code for generating parity symbols ($P_j$) based on, for each parity symbol, a plurality of source symbols and at least one parity symbol having a rank that precedes a rank of a parity symbol being generated,
wherein the encoding circuit submits part (mk) of the source symbols to at least a first ciphering and submits the obtained ciphered symbols and the rest of the unciphered source symbols to the error-correction code.

22. The system of claim 21, wherein the part (mk) of the source symbols ($S_i$) is submitted to a second ciphering for transmission with no coding, in addition to the parity symbols.

23. The system of claim 22, wherein the encoding circuit is further configured to:
decipher the symbols submitted to the second ciphering and received with no coding;
submit the deciphered symbols to the first ciphering; and
submit the symbols resulting from the previous step and the received parity symbols ($P_j$) to a decoding by the error-correction code.

24. The system of claim 22, wherein the first and second cipherings differ by the used key and/or by the ciphering algorithm.

25. The system of 21, wherein the number (mk) of ciphered source symbols ranges between 0.1% and 1% of the total number (k) of source symbols ($S_i$).

26. The system of claim 21, wherein the source symbols ($S_i$) to be ciphered are selected so that each parity symbol ($P_j$) comprises at least one ciphered source symbol.

27. The system of claim 21, wherein the error-correction code is represented by a parity matrix in which each line represents an equation for obtaining a parity symbol ($P_j$) and each column represents a source symbol ($S_i$) or a parity symbol, each parity symbol being obtained by a combination of the source and parity symbols identified in the columns of the corresponding line.

28. The system of claim 27, wherein the source symbols ($S_i$) identified in less than 1% of the lines of the matrix based on the first one are submitted to the ciphering.

29. The system of claim 27, wherein the part of the parity symbols ($P_j$) of the matrix forms a staircase.

30. The system of claim 27, wherein the part of the parity symbols ($P_j$) of the matrix forms a triangle.

* * * * *